United States Patent
Kishi

(10) Patent No.: US 9,554,075 B2
(45) Date of Patent: Jan. 24, 2017

(54) IMAGE SENSOR AND IMAGE CAPTURING APPARATUS

(71) Applicant: CANON KABUSHIKI KAISHA, Tokyo (JP)

(72) Inventor: Takafumi Kishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 14/692,011

(22) Filed: Apr. 21, 2015

(65) Prior Publication Data

US 2015/0304586 A1 Oct. 22, 2015

(30) Foreign Application Priority Data

Apr. 22, 2014 (JP) ................................. 2014-088551
Mar. 3, 2015 (JP) ................................. 2015-041779

(51) Int. Cl.
*H04N 5/374* (2011.01)
*H04N 5/378* (2011.01)
*H04N 5/357* (2011.01)
*H04N 5/3745* (2011.01)

(52) U.S. Cl.
CPC ............ *H04N 5/378* (2013.01); *H04N 5/3575* (2013.01); *H04N 5/37457* (2013.01)

(58) Field of Classification Search
CPC . H04N 5/3741; H04N 5/3745; H04N 5/37455
USPC ................................ 348/294–310; 250/208.1
See application file for complete search history.

(56) References Cited

U.S. PATENT DOCUMENTS

| 7,952,630 | B2* | 5/2011 | Taura | H04N 5/378 348/294 |
| 2005/0195304 | A1* | 9/2005 | Nitta | H03M 1/1023 348/308 |
| 2008/0284886 | A1* | 11/2008 | Wakabayashi | H04N 5/335 348/301 |
| 2015/0062394 | A1* | 3/2015 | Ikeda | H04N 5/347 348/301 |

FOREIGN PATENT DOCUMENTS

| JP | 2001-083407 A | 3/2001 |
| JP | 2004-134867 A | 4/2004 |
| JP | 2005-278135 A | 10/2005 |

* cited by examiner

*Primary Examiner* — Anthony J Daniels
(74) *Attorney, Agent, or Firm* — Cowan, Liebowitz & Latman, P.C.

(57) ABSTRACT

An image sensor includes a plurality of pixels arranged in matrix, each pixel including a plurality of photoelectric conversion portions, and analog/digital converters configured to convert analog signals from pixels into digital signals provided by column. The analog/digital converter performs a first operation of converting an analog signal corresponding to the reset level into a digital signal, a second operation of converting analog signals obtained from some portions of the plurality of photoelectric conversion portions into digital signals, and a third operation of converting analog signals obtained from all the plurality of photoelectric conversion portions into digital signals.

20 Claims, 14 Drawing Sheets

IMAGE SENSOR AND IMAGE CAPTURING APPARATUS

BACKGROUND OF THE INVENTION

Field of the Invention

The present invention relates to an image sensor and an image capturing apparatus.

Description of the Related Art

Recently, there has been developed a CMOS image sensor which has a plurality of pixels arranged in row and column directions, with analog/digital converters (A/D converters) being arranged by column of a plurality of pixels, and is designed to convert analog signals from pixels into digital signals and output them. When outputting a pixel signal by column from the image sensor by A/D-converting the signal using the A/D converter arranged for each column, it is possible to digitally perform horizontal transfer of the pixel signals from the image sensor.

The technique disclosed in Japanese Patent Laid-Open No. 2005-278135 uses a single-slope type A/D converter as an A/D converter. A single-slope type A/D converter includes a comparator and a counter. While an analog pixel signal is input to one input terminal of the comparator, a ramp signal whose voltage level changes with a predetermined slope with the lapse of time is input as a reference signal to the other input terminal. An output from the comparator is inverted when the magnitude relation between the pixel signal and the reference signal is inverted. The counter starts counting when a ramp signal is generated. When an output from the comparator is inverted, the counter stops. The value counted by the counter becomes a digital value corresponding to the level of the analog pixel signal.

In addition, the technique disclosed in Japanese Patent Laid-Open No. 2005-278135 uses, as a means for taking the difference between the reset component of a pixel signal and the signal component generated by a photodiode, a method of subtracting the reset component from the signal component by inverting the counting direction of an UP/DOWN counter. This method requires only one counter, and does not require any subtractor which subtracts a reset component from a signal component, thereby achieving a reduction in circuit scale.

Each pixel of a recent CMOS image sensor has a feature that two or more photodiodes share a readout circuit after a floating diffusion which transfers the signal generated by a photodiode. According to Japanese Patent Laid-Open No. 2004-134867, when signals are output from two photodiodes sharing a floating diffusion, a reset level is read out first, and the signal of the first photodiode is then read out. In addition, while the floating diffusion is not reset, the signal of the second photodiode is read out following the signal of the first photodiode. The respective signals are subtracted to read out signals obtained by excluding the reset level from each of the signals from the two photodiodes. This method can save the time taken to read out one reset level, and hence can shorten the time required to read out pixel signals.

In addition, as disclosed in Japanese Patent Laid-Open No. 2001-83407, there is available a technique of arranging photodiodes for autofocus for a CMOS image sensor. According to Japanese Patent Laid-Open No. 2001-83407, two photodiodes are provided below one microlens. The respective photodiodes are configured to receive light from different pupil planes of an image capturing lens. Comparing outputs from the two photodiodes can perform focus detection. It is also possible to use the sum of outputs from the two photodiodes as an image signal.

However, the single-slope type A/D converter using the UP/DOWN counter disclosed in Japanese Patent Laid-Open No. 2005-278135 cannot use the technique of shortening the time like that disclosed in Japanese Patent Laid-Open No. 2004-134867. According to the method disclosed in Japanese Patent Laid-Open No. 2005-278135, when a reset level is read out first and then the signal of the first photodiode is read out, the counter is inverted to obtain a signal by subtracting the reset level from the signal of the first photodiode. As a result, the information of the reset level is lost. When the signal of the second photodiode is A/D-converted following the signal of the first photodiode, the value of the signal of the first photodiode and the value of reset-level signal are also lost. This makes it impossible to perform proper difference processing. It is therefore difficult to use the technique disclosed in Japanese Patent Laid-Open Nos. 2005-278135 and 2004-134867 to shorten the time taken to read out signals in a CMOS image sensor having two photodiodes provided for one microlens as disclosed in Japanese Patent Laid-Open No. 2001-83407.

SUMMARY OF THE INVENTION

The present invention can provide an image sensor advantageous in shortening the time required for output as an image sensor which analog/digital-converts signals from a plurality of photodiodes sharing a floating diffusion and outputs the resultant signals.

According to an aspect of the present invention, the present invention provides an image sensor comprising a plurality of pixels arranged in matrix, with each pixel including a plurality of photoelectric conversion portions, a floating diffusion portion shared by the plurality of photoelectric conversion portions, a transfer portion configured to transfer charges generated by the plurality of photoelectric conversion portions to the floating diffusion portion, and a reset portion configured to reset the floating diffusion portion, and analog/digital converters configured to convert analog signals corresponding to the amounts of charges in the floating diffusion portions into digital signals are provided by column, wherein the analog/digital converter includes a comparator configured to compare the analog signal with a reference signal and change an output in accordance with a magnitude relation between the signals and a counter to be controlled by an output from the comparator, performs a first operation of converting an analog signal corresponding to the amount of charges in the floating diffusion portion reset by the reset portion into a digital signal, a second operation of converting analog signals obtained from some portions of the plurality of photoelectric conversion portions into digital signals, and a third operation of converting analog signals obtained from all the plurality of photoelectric conversion portions into digital signals, and increases or decreases a count value of the counter in a first direction in the first operation, and increases or decreases the count value of the counter in a direction opposite to the first direction in the second operation and the third operation.

Further features of the present invention will become apparent from the following description of exemplary embodiments with reference to the attached drawings.

DESCRIPTION OF THE EMBODIMENTS

First Embodiment

Figure 1:
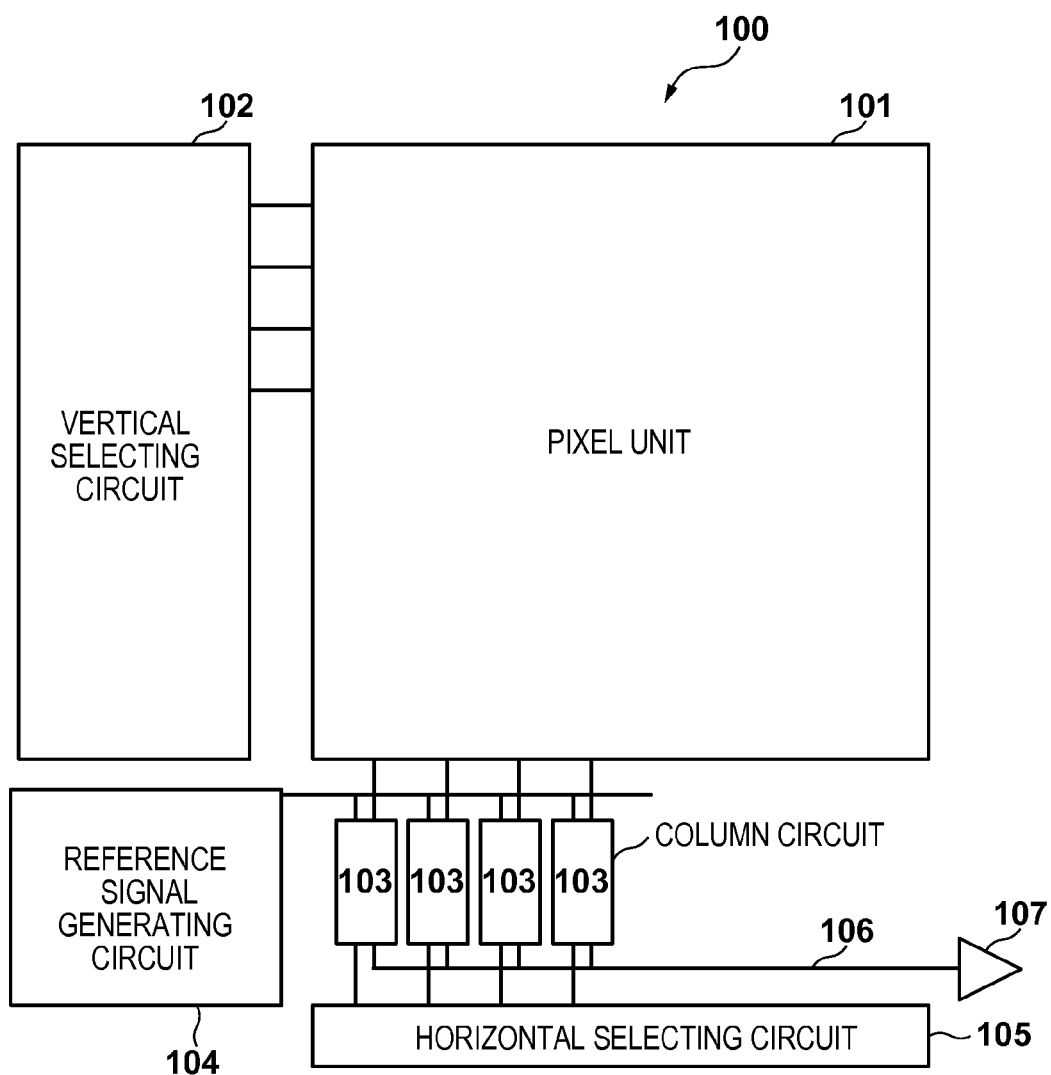
FIG. 1 is a schematic view showing the arrangement of an image sensor according to an embodiment of the present invention.

The first embodiment of the present invention will be described below with reference to FIGS. 1 to 4. FIG. 1 is a view schematically showing the overall arrangement of an image sensor 100 according to this embodiment. Referring to FIG. 1, the image sensor 100 includes a pixel unit 101 having a plurality of pixels arranged in matrix. A vertical selecting circuit 102 which selects arranged pixels by row is arranged on the periphery of the pixel unit 101. Signals from the pixels selected by the vertical selecting circuit 102 are input to column circuits 103 provided by column of pixels. The column circuits 103 are circuits which A/D-convert the input signals and output the resultant signals to a horizontal output line 106. A horizontal selecting circuit 105 sequentially selects the column circuits 103. The selected column circuits 103 A/D-convert signals from the pixel unit 101 and output the resultant signals to the horizontal output line 106. The signals output to the horizontal output line 106 are output from the image sensor 100 via an output amplifier 107. The reference signal (ramp signal) which is generated by a reference signal generating circuit 104 and has a voltage level changing with a predetermined slope with the lapse of time is input to each column circuit 103 to be used for A/D conversion. Note that a timing generator, a control circuit, or the like which provides timing signals controls the respective portions of the image sensor.

Figure 2:
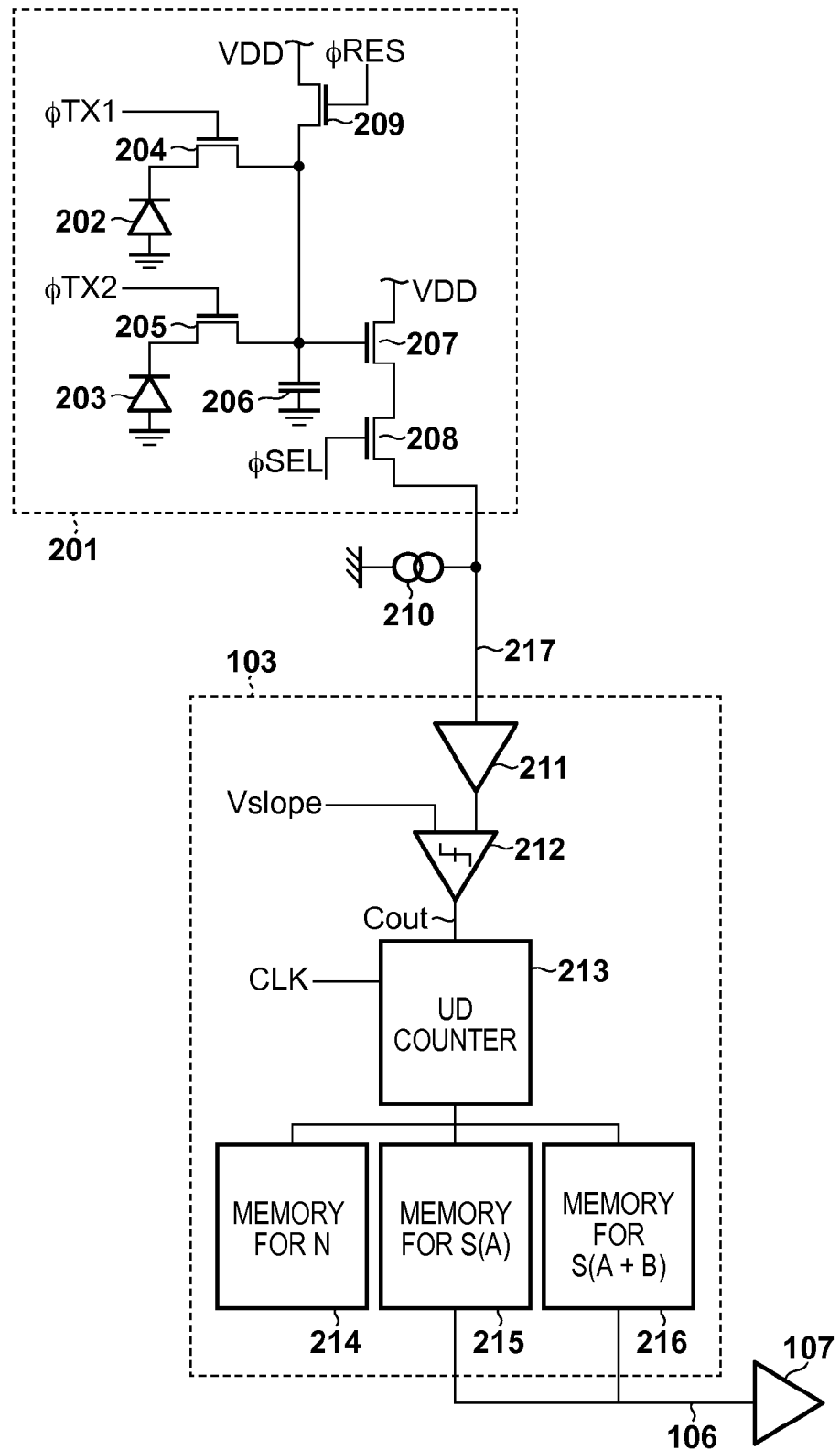
FIG. 2 is a view showing a pixel and a column circuit according to the first embodiment.

FIG. 2 is a view showing a pixel and a column circuit according to the first embodiment. This embodiment will exemplify a case in which a pixel 201 is provided with two photodiodes (to be referred to as "PDs" hereinafter) 202 and 203 which are photoelectric conversion portions for converting light into charges. However, the number of PDs is not limited to two. In order to obtain a visually stereoscopic image or a signal for focus detection, a plurality of PDs can be arranged and used for one pixel. The PDs 202 and 203 share a floating diffusion portion (to be referred to as an "FD" hereinafter) 206 which converts charges into a voltage. Transfer transistors 204 and 205 are provided between the PDs 202 and 203 and the FD 206, respectively. The transfer transistors 204 and 205 are respectively driven by transfer pulses φTX1 and φTX2. When the transfer pulses φTX1 and φTX2 are set at high level (H level), the transfer transistors 204 and 205 operate as transfer portions which transfer the charges generated by the PDs 202 and 203 to the FD 206.

An amplifying transistor 207 and a reset transistor 209 are connected to the FD 206. An output from the amplifying transistor 207 is output to a column output line 217 connected to the column circuit 103 via a selection transistor 208. A constant current source 210 is connected to the column output line 217. The FD 206, the amplifying transistor 207, and the constant current source 210 constitute a floating diffusion amplifier. When a selection pulse φSEL is set at H level, the selection transistor 208 is turned on to output, to the column circuit 103, a pixel signal from the PD which is converted into a voltage by the FD 206 and amplified by the amplifying transistor 207. The reset transistor 209 is a reset portion which is turned on when a reset pulse φRES is set at H level, and resets the FD 206 or the like using a power supply voltage VDD. Note that the constant current source 210 is arranged for each column like a column circuit.

In this embodiment, although the transfer transistors 204 and 205 are respectively connected to the PDs 202 and 203, the PDs 202 and 203 share the signal readout circuit constituted by the FD 206, the reset transistor 209, the amplifying transistor 207, the selection transistor 208, and the like.

The arrangement of each column circuit 103 will be described next. An amplifier 211 provided in the column circuit 103 amplifies the pixel signal output from the selection transistor 208 to the column circuit 103 via the column output line 217. Note that, from a low noise point of view, the amplifier 211 may be an amplifier having a gain. However, this is not always necessary. An analog signal output from the amplifier 211 is input to one input terminal of a comparator 212. A reference signal (ramp signal) Vslope supplied from the reference signal generating circuit 104 is input to the other input terminal of the comparator 212. The comparator 212 compares the voltage level of an output from the amplifier 211, that is, a pixel signal which is an amplified analog signal, with the voltage level of the reference signal Vslope, and outputs a comparison output Cout depending on the magnitude relation between the voltage level of the output from the amplifier 211 and that of the reference signal Vslope.

The comparison output Cout takes two values, namely a low level (L level) and a high level (H level). In this embodiment, when the voltage level of the reference signal Vslope is equal to or less than the output of the amplifier 211, the comparison output Cout takes the L level. When the voltage level of the reference signal Vslope is higher than the output of the amplifier 211, the comparison output Cout takes the H level. A counter 213 is a counter capable of switching between counting up and counting down, and is a presettable counter which counts up or down a clock CLK when the clock CLK is input. The clock CLK is input to the counter 213 at the same time as the start of the generation of the reference signal Vslope. When the comparison output Cout is at H level, the counter 213 performs a counting operation (counting up or counting down). When the comparison output Cout is set at L level, the counter 213 simultaneously stops the counting operation. The counter 213 can be implemented by a general circuit. The counter 213 digitally converts an analog signal input to the comparator 212 into a digital signal.

As described above, the amplifier 211 and the counter 213 constitute a slope type analog/digital converter. The output terminal of the counter 213 is provided with memories 214 to 216 for storing a count value from the counter 213. That is, the memories 214 to 216 store the digital signals obtained by analog/digital conversion (A/D conversion). The memories 214 to 216 have the following functions. The memory 214 stores the value obtained as a result of A/D-converting the reset signal (N signal) level of the FD 206. The memory 215 stores the value (to be referred to as the S(A) signal hereinafter) obtained by subtracting the N signal of the FD 206 from the signal (to be referred to as the S(A)+N signal hereinafter) obtained by superimposing a pixel signal from the PD 202 and the N signal from the FD 206. The memory 216 stores the value (to be referred to as the S(A+B) signal hereinafter) obtained by subtracting the N signal from the signal (to be referred to as the S(A+B)+N signal hereinafter) obtained by superimposing a pixel signal S(B) from the PD 203, the N signal, and the S(A) signal. Digital signals stored in the memories 215 and 216 are selected by a signal from the horizontal selecting circuit 105 and read out from the image sensor 100 via the horizontal output line 106 and the output amplifier 107. It is possible to obtain the image signal S(B) from the PD 203 by subtracting the digital signal S(A) from the PD 202, which is stored in the memory 215, from the S(A+B) digital signal from PD 202 and PD 203, which is stored in the memory 216.

Figure 3A:
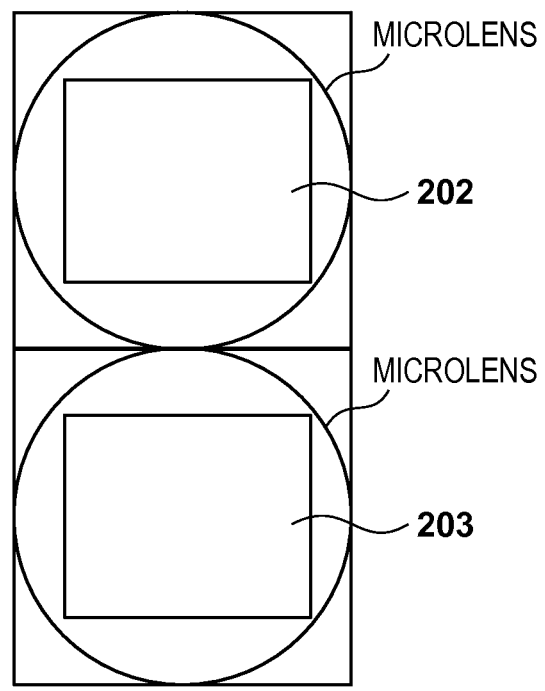
FIGS. 3A and 3B are views for schematically explaining the arrangement of one pixel.
Figure 3B:
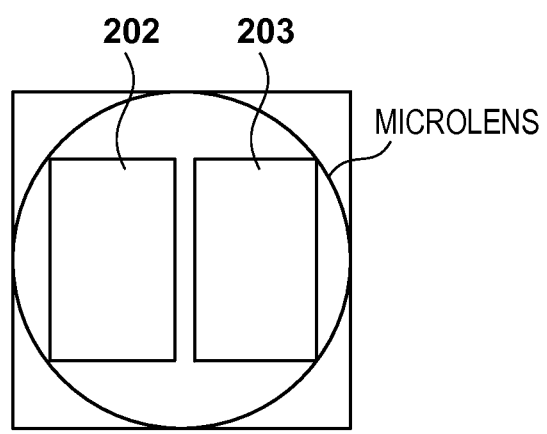

Microlenses for focusing light on the PDs are arranged in the pixel unit 101, as shown in FIGS. 3A and 3B. The microlenses may be respectively arranged for the PDs 202 and 203, as shown in FIG. 3A. Alternatively, as shown in FIG. 3B, the PDs 202 and 203 may share a microlens. When sharing the microlens as shown in FIG. 3B, it is possible to obtain a signal for focus detection and an image signal by using the PDs 202 and 203.

Figure 4:
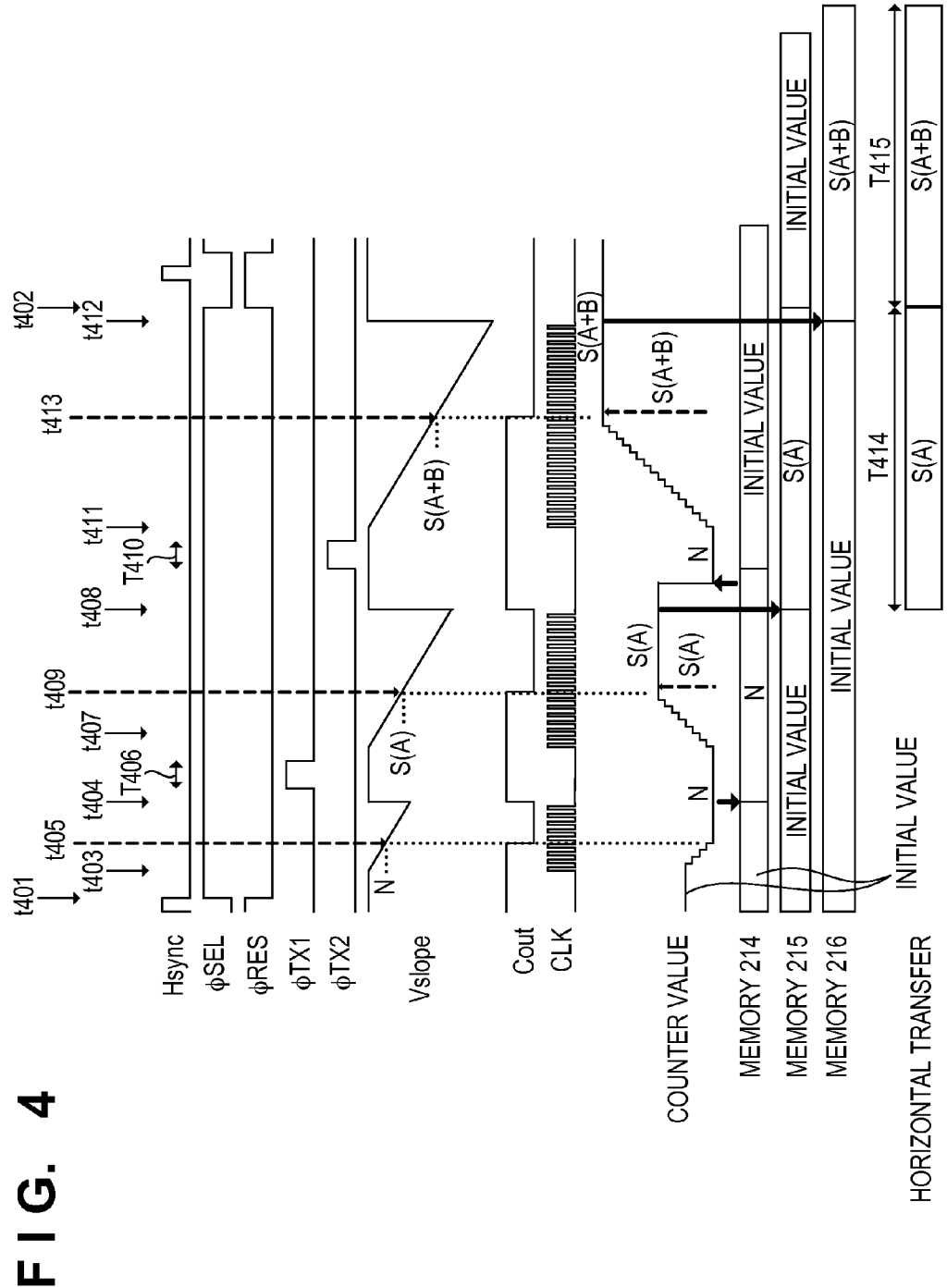
FIG. 4 is a timing chart showing a method of driving the image sensor according to the first embodiment.

The operation of the image sensor will be described next with reference to the timing chart of FIG. 4. The interval from the instant a horizontal synchronization pulse Hsync goes from H level to L level and the instant the horizontal synchronization pulse Hsync goes to H level again represents the operation timing associated with a readout operation for one row of the pixel unit 101. Readout of pixel signals from pixels on one row and A/D conversion are performed by column. The following is an outline of this operation. The selection transistor 208 is turned on, by changing selection pulse φSEL from L level to H level, to respectively connect the pixels arranged on one row of the pixel unit 101 in the column direction to the column circuits 103. Thereafter, at time t402 when the A/D conversion of signals from the pixels on one row is complete, the reset transistor 209 is turned on again by setting the reset pulse (RES at H level. At the same time, the selection transistor 208 is turned off again by setting the selection pulse SEL at L level. With the above operation, the readout operation from pixels on one row is complete. The operation of this embodiment will be sequentially described along the timing chart. Note that the part related to this embodiment will be described below, but a description of the general readout operation from pixels will be omitted.

First of all, at time t401, the reset pulse (RES goes from H level to L level to change the reset transistor 209 from the ON state to the OFF state, thereby canceling the reset state of the FD 206. While the reset transistor 209 is turned off at time t401, the voltage of the reset signal (N signal) is stored in the FD 206. At this time, since the selection pulse φSEL is at H level, the selection transistor 208 is ON, and a voltage corresponding to the N signal in the FD 206 is input to one input terminal of the comparator 212 via the amplifier 211. Thereafter, the A/D conversion of the N signal starts. At time t403, the reference signal generating circuit 104 generates the ramp signal Vslope which decreases from the initial value with the lapse of time. The ramp signal Vslope is input to the other input terminal of the comparator 212. The clock CLK is supplied to the counter 213 simultaneously with the start of the generation of the ramp signal Vslope.

When the counter 213 is set in the count down mode at the beginning, the count value of the counter 213 decreases in accordance with the number of clocks CLK supplied. At time t405, when the voltage level of the ramp signal Vslope input to the comparator 212 matches that of the N signal, the output Cout from the comparator 212 is inverted from H level to L level. When the output Cout is set at L level, the counter 213 simultaneously stops the count down operation. The value counted by the counter 213 from the initial value up to time t405 is obtained as the digital value obtained by A/D-converting the N signal. Time t404 represents a predetermined time required to A/D-convert the N signal. The interval from time t403 when the ramp signal Vslope is generated to time t404 is an N signal readout period. At time t404, the count value of the counter 213, which corresponds to the digital value obtained by A/D-converting the N signal, is copied to the memory 214. The timing when the count value of the counter 213 is copied to the memory 214 may overlap a period T406 (to be described later) after time t404.

In the period T406 after time t404, the transfer pulse φTX1 is set at H level to turn on the transfer transistor 204 to transfer the pixel signal having undergone photoelectric conversion and stored in the PD 202 to the FD 206. As a result, the S(A)+N signal obtained by superimposing the pixel signal from the PD 202 and the N signal is stored in the FD 206. A voltage corresponding to the S(A)+N signal in the FD 206 is input to one input terminal of the comparator 212 via the amplifier 211. In this state, at time t407, the reference signal generating circuit 104 starts generating the reference signal (ramp signal) Vslope which decreases from the initial value with the lapse of time. The clock CLK is supplied to the counter 213 simultaneously with the start of the generation of the ramp signal Vslope to make the counter 213 perform a counting operation. In this case, if the counter 213 is set in the count up mode in advance, the count value of the counter 213 increases in accordance with the number of clocks CLK supplied. At time t409, when the voltage level of the ramp signal Vslope input to the comparator 212 matches that of the S(A) signal, the comparator 212 inverts the output Cout from H level to L level. The counter 213 stops the count up operation at the same time when the output Cout is set to L level. The value counted by the counter 213 from the initial value corresponding to the N signal obtained by the count down operation up to time t409 is obtained by the counter 213 as a value corresponding to the S(A) signal obtained by subtracting the N signal from the S(A)+N signal. Time t408 represents a predetermined time required to A/D-convert the S(A) signal. The interval from time t407 to time t408 is a readout period for the S(A) signal. Subsequently, at time t408, after the S(A) signal readout period ends, the value of the counter 213 obtained by A/D-converting the S(A) signal is copied to the memory 215. The value of the S(A) signal stored in the memory 215 is sequentially selected by column by the horizontal selecting circuit 105 during a horizontal transfer period T414, sequentially output from the memory 215, and output to the horizontal output line 106.

After time t408, before the A/D conversion of the S(A+B) signal, the value of the N signal stored in the memory 214 is set in the counter 213. The period during which the value of the counter 213, which corresponds to the digital value obtained by A/D-converting the S(A) signal, is copied to the memory 215, and the period during which the value of the N signal stored in the memory 214 is set in the counter 213 may overlap a period T410 (to be described later).

Subsequently, in the period T410, the transfer pulse φTX2 is set at H level to turn on the transfer transistor 205 to transfer the signal stored in the PD 203 to the FD 206. As a result, the signal from the PD 203 is added to the signal from the PD 202 and the N signal, and the S(A+B)+N signal is stored in the FD 206. A voltage corresponding to the S(A+B)+N signal in the FD 206 is input to one input terminal of the comparator 212 via the amplifier 211. In this state, at time t411, the reference signal generating circuit 104 starts generating the reference signal (ramp signal) Vslope. The clock CLK is supplied to the counter 213 to make it perform a counting operation simultaneously with the start of the generation of the ramp signal Vslope. At this time, the counter 213 is set in the count up mode. In accordance with the number of clocks CLK supplied, the count value of the counter 213 increases from the value of the N signal (the value obtained by counting down the reset signal) set from the memory 214 into the counter 213. At time t413, when the voltage level of the ramp signal Vslope input to the comparator 212 matches the level of the S(A+B) signal, the comparator 212 inverts the output Cout from H level to L level. The counter 213 stops the count up operation at the same time when the output Cout is set at L level. Since the initial value of the counter 213 is the value corresponding to the N signal obtained by the count down operation, the value obtained by counting up by the counter 213 up to time t413 is the value obtained by subtracting the N signal from the S(A+B)+N signal. Therefore, at time t413, the counter 213 stores the value obtained by A/D-converting the S(A+B) signal. Time t412 represents a predetermined time required to A/D-convert the S(A+B) signal. Therefore, the interval from time t411 to time t412 is a readout period for the S(A+B) signal. At time t412, after the S(A+B) signal readout period ends, the value of the counter 213 is copied to the memory 216. As a result, the digital value obtained by A/D-converting the S(A+B) signal is stored in the memory 216.

As described above, before the S(A+B) signal readout period, the N signal stored in the memory 214 is set in the counter 213. This makes it possible to take the difference between the S(A+B)+N signal and the N signal as the reset voltage when the counter A/D-converts the S(A+B) signal. This arrangement makes it possible to perform N signal readout, S(A) signal readout, and S(A+B) signal readout. This makes it possible to shorten the time required for A/D conversion by the time for one N signal readout as compared with the operation of reading out the N signal and subtracting it every time S(A) signal readout and S(A+B) signal readout are performed. In addition, since a digital signal corresponding to the pixel signal of each PD can be obtained from each signal difference read out, a focus detection signal and an image signal can be obtained.

The memory 214 may store the value of the N signal until the N signal is set in the counter 213 at the time of S(A+B) signal readout. The memories 215 and 216 may store the values of pixel signals until the end of the horizontal transfer periods T414 and T415.

In this embodiment, the reference signal Vslope has been described as a ramp signal whose voltage level decreases with the lapse of time. However, this signal may be a ramp signal whose voltage level increases with the lapse of time. More specifically, if the amplifier 211 is a non-inverting amplifier, since the output of the amplifier 211 decreases with an increase in signal from the PD, the reference signal can be a signal whose voltage level decreases with the lapse of time. When the amplifier 211 is an inverting amplifier, since the output of the amplifier 211 increases with an increase in signal from the PD, it is possible to use, as a reference signal, a signal whose voltage level increases with the lapse of time. If the reference signal Vslope is a voltage whose voltage level increases with the lapse of time, it is necessary to invert the functions of L level and H level of the output Cout which controls the counting operation of the counter 213. A description of this point will be omitted.

In addition, the counting direction (up or down) of the counter 213 may be inverted. In this case, since the magnitude relation between the values of A/D-converted signals is inverted, signals may be inverted by an image capturing signal processing circuit 506 (FIG. 5) or the like which processes output signals from the image sensor.

Figure 5:
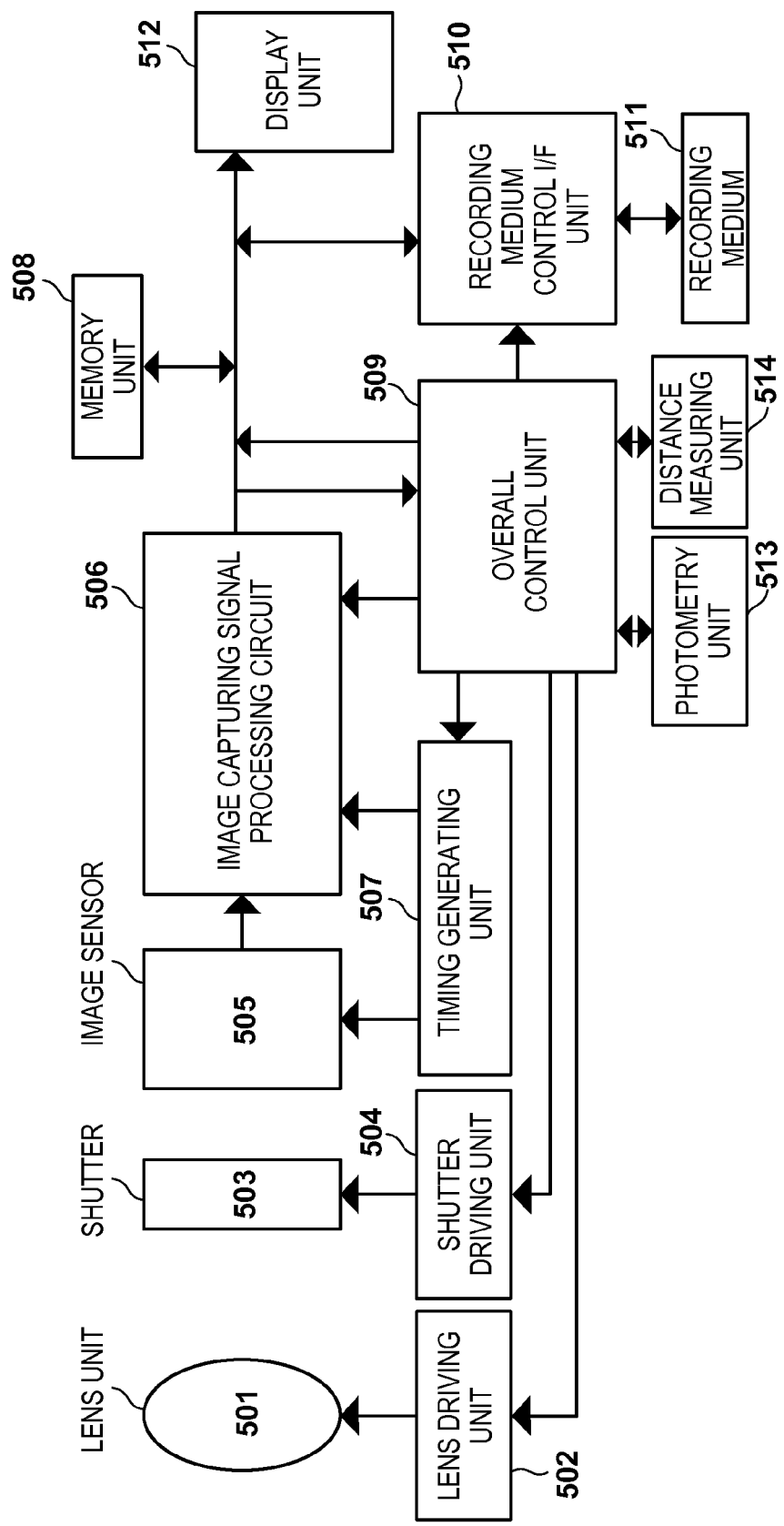
FIG. 5 is a schematic view showing the arrangement of an image capturing apparatus according to an embodiment of the present invention.

An embodiment in which the image sensor according to this embodiment is applied to an image capturing apparatus 500 will be described in more detail next with reference to FIG. 5. A lens unit 501 of an optical system forms an optical image of an object on an image sensor 505. A lens driving unit 502 performs zoom control, focus control, stop control, and the like by driving the lens unit 501. In this embodiment, a shutter driving unit 504 controls a mechanical shutter 503 so as to control opening/closing and speed of the shutter. The image sensor 505 converts the object image formed by the lens unit 501 into an image signal and outputs it. According to the embodiment, an image signal from the image sensor 505 is output as a digital value. The image capturing signal processing circuit 506 performs various types of correction for the image signal output from the image sensor 505 and compresses data. A timing generating unit 507 outputs various types of timing signals for driving the image capturing apparatus including the image sensor 505 and the image capturing signal processing circuit 506. An overall control unit 509 controls various types of arithmetic operations and the overall image capturing apparatus. A memory unit 508 temporarily stores image data. A recording medium control I/F unit 510 records or reads out data on or from a recording medium. A recording medium 511 is a detachable recording medium such as a semiconductor memory for recording or reading out image data. A display unit 512 is a display unit which displays various types of information and shot images.

The operation of the image capturing apparatus according to this embodiment will be described next. When the main power supply of the image capturing apparatus is turned on, the power supply of the control system including the overall control unit 509 and the timing generating unit 507 is turned on. In addition, the power supply of the image capturing system circuit including the image capturing signal processing circuit 506 is turned on.

When a release button (not shown) is pressed, a distance measuring unit 514 obtains the distance to an object by operating in cooperation with the overall control unit 509 based on an image signal from the image sensor. Thereafter, the lens driving unit 502 drives the lens unit, and the overall control unit 509 determines whether an in-focus state is obtained. Upon determining that an in-focus state is not obtained, the overall control unit 509 performs distance measurement again. In distance measurement, the mechanical shutter 503 may be opened to project an object image on the image sensor 505, and the image capturing signal processing circuit 506 and the overall control unit 509 may process an image capturing signal, thereby computing the distance to the object. When using the image sensor according to this embodiment, it is possible to detect a focus by using the phase difference between pixel signals from two PDs below one microlens. In this case, an image signal can be obtained by combining pixel signals from the two PDs. These processes can be performed by making the image capturing signal processing circuit 506 and the overall control unit 509 process the A/D-converted signal output from the image sensor.

After an in-focus state is confirmed, an image capturing operation starts. At the start of an image capturing operation, the gain setting of the image sensor 505 is performed in accordance with the sensitivity setting made by the camera. The sensitivity setting may be obtained from the photometric value determined by a photometry unit 513 or set by using a sensitivity setting button (not shown) or the like.

When the image capturing operation is complete, the image capturing signal processing circuit 506 processes the image signal output from the image sensor 505. The overall control unit 509 then stores the resultant data in the memory unit 508. The data stored in the memory unit 508 is recorded on the detachable recording medium 511 such as a semiconductor memory via the recording medium control I/F unit 510 under the control of the overall control unit 509. In addition, this data may be directly input to a computer or the like via an external I/F unit (not shown) to be subjected to image processing.

Second Embodiment

Figure 6:
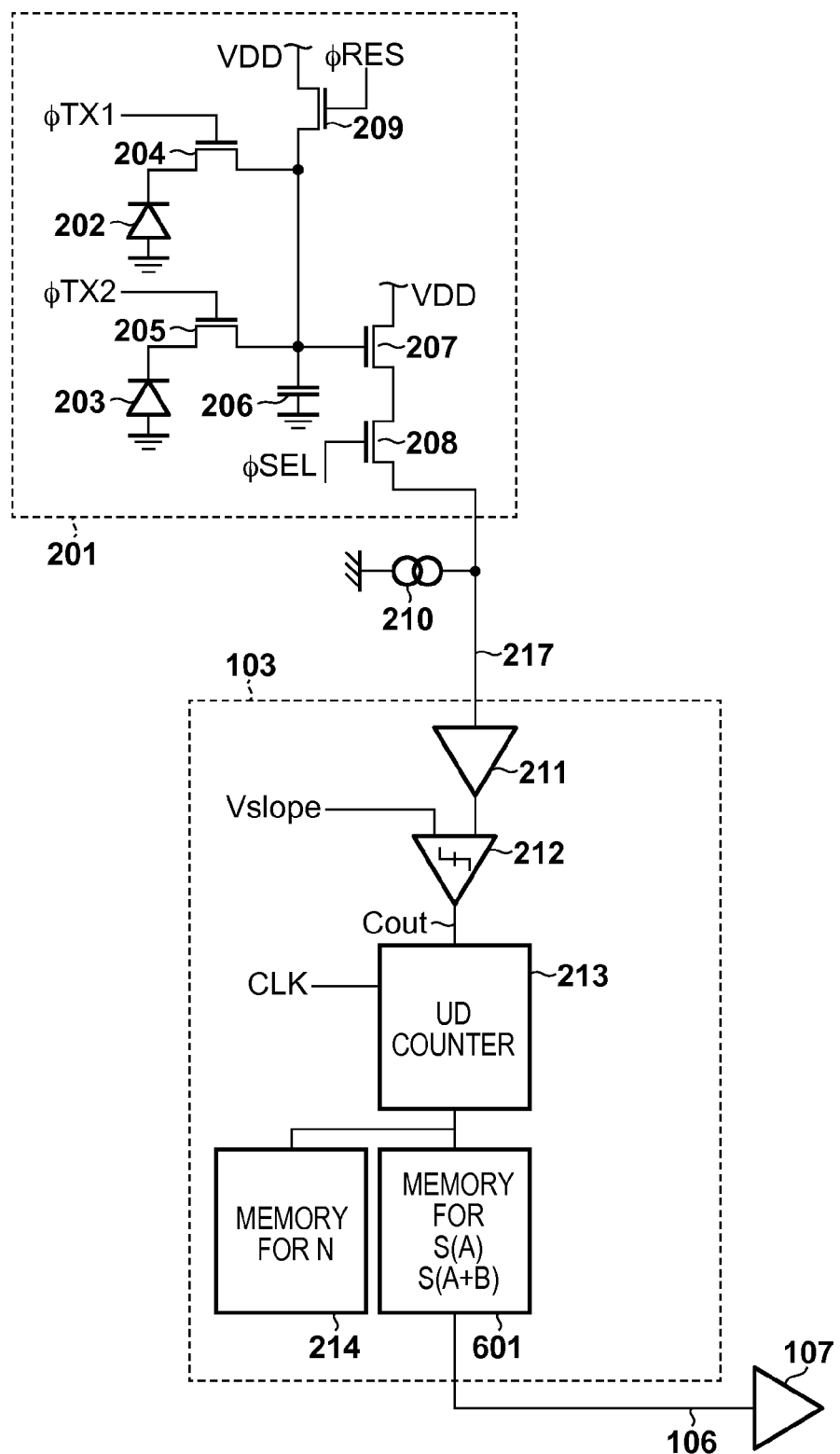
FIG. 6 is a view showing a pixel and a column circuit according to the second embodiment.

The second embodiment of the present invention will be described next. FIG. 6 is a view showing the arrangements of a pixel and a column circuit in an image sensor according this embodiment. The same reference numerals as in FIG. 2 in the first embodiment denote the same components, and a repetitive description of them will be omitted. A difference from the first embodiment is that a common memory 601 serves as both the memory 215 which stores the value of the S(A) signal and the memory 216 which stores the value of the S(A+B) signal. The memory 601 stores the digital value obtained by A/D-converting the S(A) signal at a given timing, and stores the digital value obtained by A/D-converting the S(A+B) signal at another timing.

Figure 7:
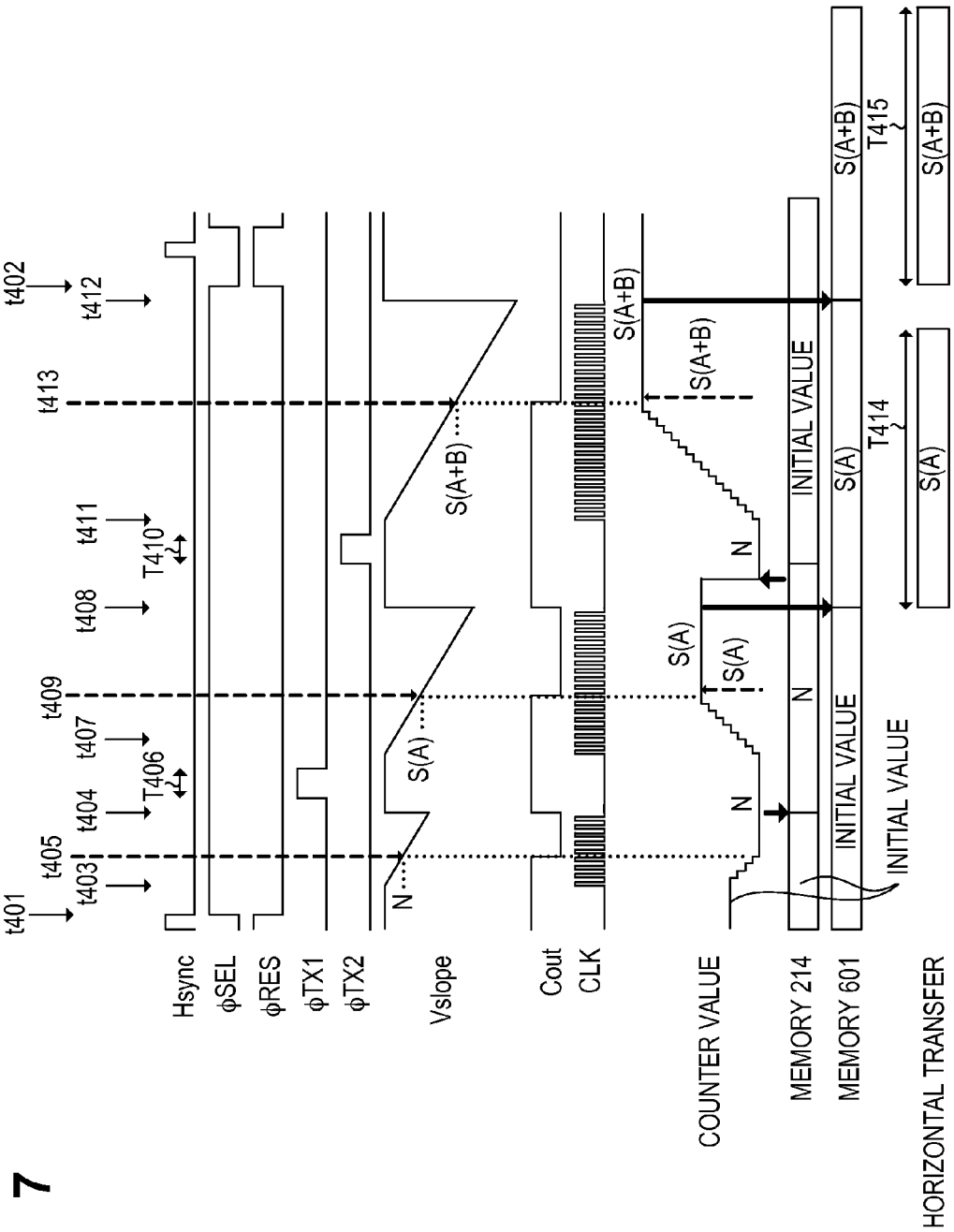
FIG. 7 is a timing chart showing a method of driving the image sensor according to the second embodiment.

A method of driving the image sensor according to the second embodiment of the present invention will be described with reference to FIG. 7. As described in the first embodiment, the A/D conversion of a reset signal (N signal) starts from time t403. The value of the N signal obtained at time t405 is stored in a memory 214 at time t404. The A/D conversion of the S(A) signal starts from time t407 upon inverting the counting direction of a counter 213. As a result, the counter 213 stores a digital value corresponding to the S(A) signal from which the N signal is subtracted at time t409. Thereafter, after the S(A) signal readout period ends at time t408, the digital value corresponding to the S(A) signal stored in the counter 213 is copied to the memory 601. After the digital value corresponding to the S(A) signal is copied to the memory 601, the value of the S(A) signal stored in the memory 601 is output to a horizontal output line 106 during a horizontal transfer period T414.

The A/D conversion of the S(A+B) signal will be described next. First of all, the value of the N signal stored in the memory 214 is set in the counter 213. In a period T410, a transfer pulse φTX2 is then set at H level. As a result, the S(A+B)+N signal is stored in the FD 206. The A/D conversion of the S(A+B) signal is performed by making the counter 213 count up during the horizontal transfer period T414 in which the value of the S(A) signal is output to the horizontal output line 106. Since the value obtained by counting down the N signal as the initial value has been set in the counter 213, a value corresponding to the S(A+B) signal is stored in the counter 213 at time t413. At time t412 after the end of the horizontal transfer period T414, the value of the S(A+B) signal stored in the counter 213 is copied to the memory 601.

As described above, the common memory is used to store the S(A) signal and the S(A+B) signal by performing horizontal transfer so as to end the horizontal transfer period T414 before the end of the S(A+B) signal readout from the counter 213. This makes it possible to reduce the circuit scale by one memory. It is also possible to prepare for the storage of a value corresponding to the (A+B) signal by resetting the memory 601 to the initial value by time t412 when the S(A+B) signal readout ends after the end of the horizontal transfer period T414. In addition, an image capturing apparatus can be formed by using the image sensor according to this embodiment for the image capturing apparatus described in the first embodiment.

Third Embodiment

Figure 8:
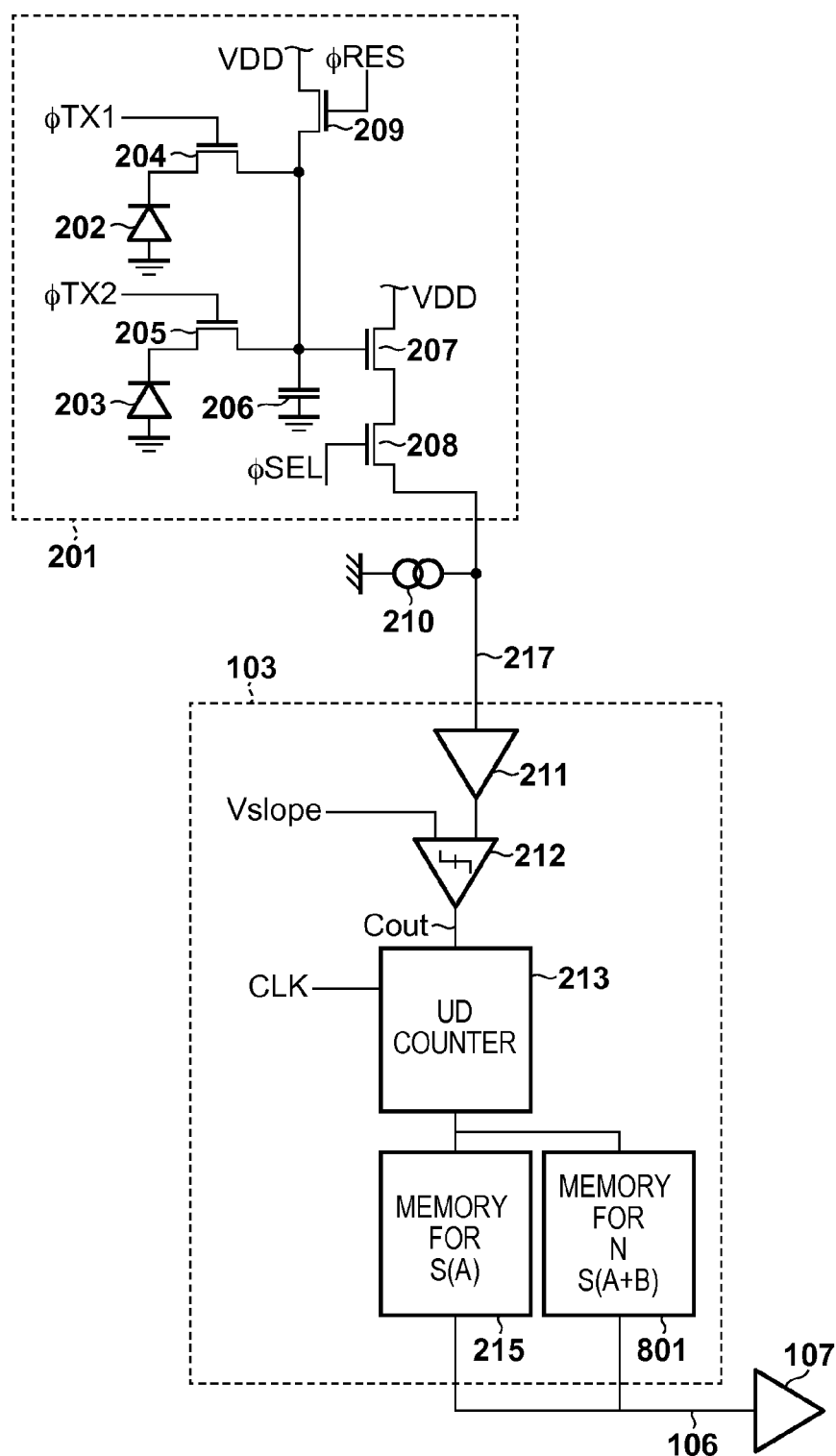
FIG. 8 is a view showing a pixel and a column circuit according to the third embodiment.

The third embodiment of the present invention will be described below with reference to the accompanying drawings. FIG. 8 is a view showing the arrangements of a pixel and a column circuit according to the third embodiment in the image sensor shown in FIG. 1. A description of the same components as those of other embodiments will be omitted. A difference from the first embodiment shown in FIG. 2 is that a memory 801 serves as both the memory 214 which stores the N signal and the memory 216 which stores the S(A+B) signal in the first embodiment. The memory 801 stores the digital value obtained by A/D-converting the N signal at a given time, and stores the digital value obtained by A/D-converting the S(A+B) signal at another time.

Figure 9:
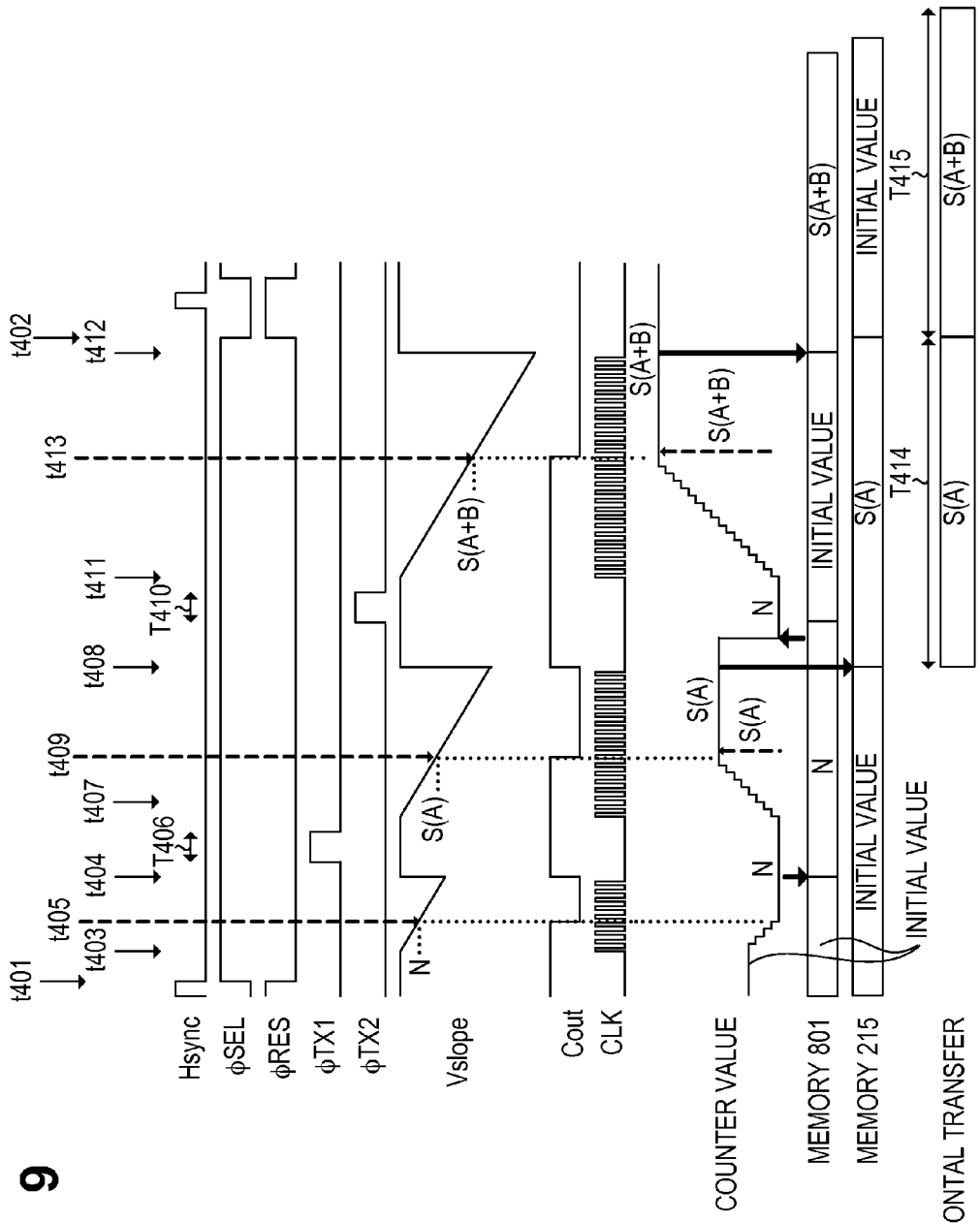
FIG. 9 is a timing chart showing a method of driving an image sensor according to the third embodiment.

A method of driving the image sensor according to the third embodiment of the present invention will be described with reference to FIG. 9. First of all, a counter 213 starts the A/D conversion of the N signal from time t403. At time t404, the value of the N signal stored in the counter 213 is copied to the memory 801. The counting direction of the counter 213 is then inverted to start the A/D conversion of the S(A) signal from time t407. As a result, at time t409, the value obtained by A/D-converting the S(A) signal is stored in the counter 213. At time t408, the S(A) signal readout ends, and the value of the counter 213 is copied to a memory 215. Thereafter, the value of the N signal stored in the memory 801 is set in the counter 213 before the A/D conversion of the S(A+B) signal. Since the value of the N signal stored in the memory 801 becomes unnecessary afterward, the memory 801 may be reset to the initial value. In a period T410, a transfer transistor 205 is turned on to transfer the charges stored in a PD 203 to an FD 206. The A/D conversion of the S(A+B)+N signal starts from time t411. The counter 213 starts counting up from the value of the set N signal. After the S(A+B) signal readout period ends at time t412, the digital value obtained by A/D-converting the S(A+B) signal stored in the counter 213 is copied to the memory 801. The horizontal transfer of the S(A) signal is performed in parallel with the A/D conversion of the S(A+B) signal. Thereafter, the horizontal transfer of the S(A+B) signal is performed in a period T415. The horizontal transfer of the S(A+B) signal may end by the time when the N signal of the pixels on the next row is read out and copied to the memory 801.

As described above, ending the horizontal transfer period T415 by the time when the N signal of the next row is stored in the memory 801 allows the memory 801 to serve as both a memory for storing the N signal and a memory for storing the S(A+B) signal, thereby reducing the circuit scale by one memory. According to the second embodiment, the horizontal transfer period T414 needs to end by the time when the S(A+B) signal is read out. In contrast to this, according to the third embodiment, the horizontal transfer period T415 needs to end by the time when the N signal of the next row is stored in the memory 801. It is possible to accelerate the speed at which pixel signals are read out from the image sensor by using an advantageous one of the above methods in accordance with the times required for the horizontal transfer period T414 and the horizontal transfer period T415. An image capturing apparatus can be formed by using the image sensor according to this embodiment for the image capturing apparatus described in the first embodiment as in the above manner.

Fourth Embodiment

Figure 10:
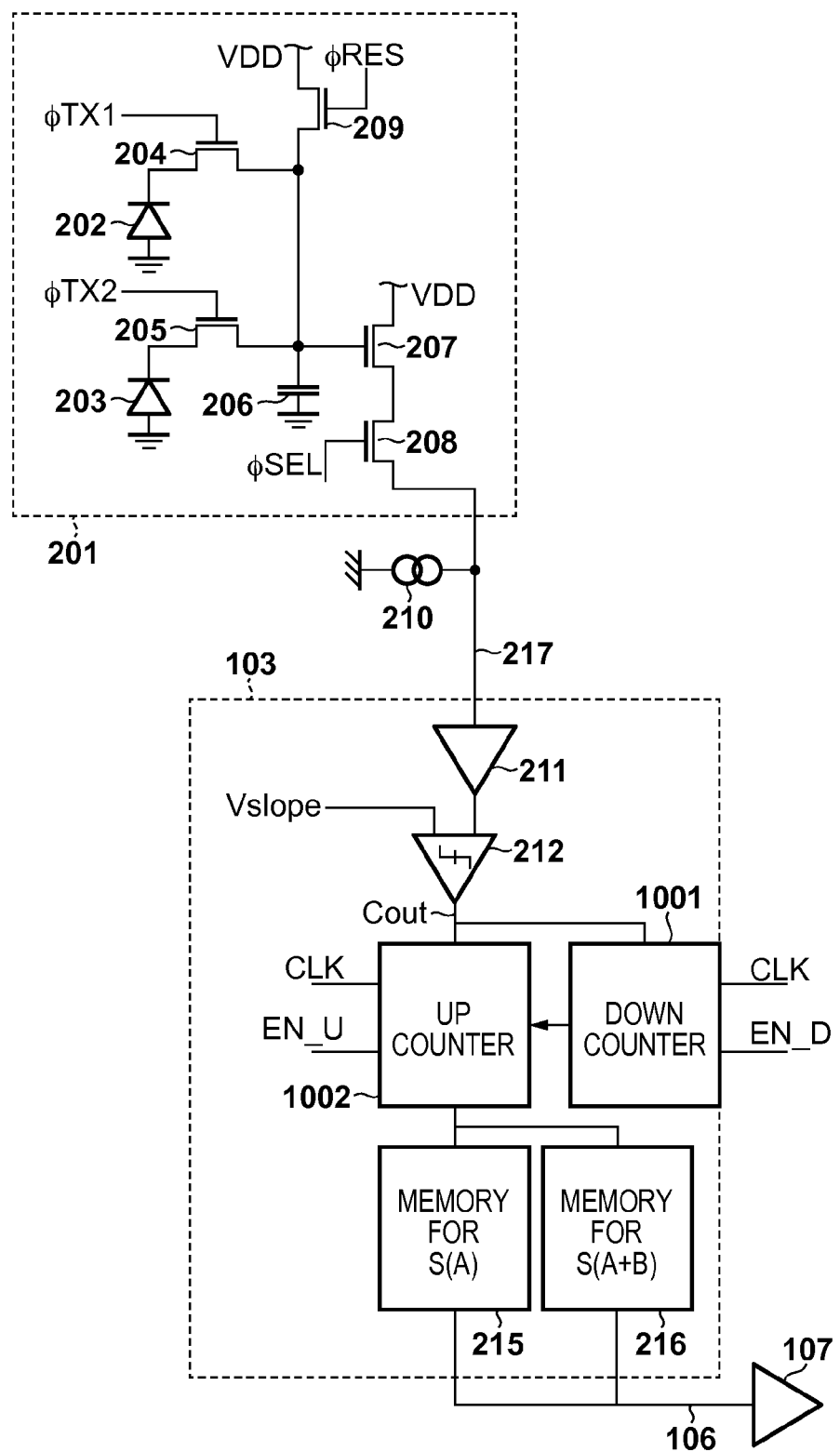
FIG. 10 is a view showing a pixel and a column circuit according to the fourth embodiment.

The fourth embodiment of the present invention will be described with reference to the accompanying drawings. FIG. 10 is a view showing the arrangements of a pixel and a column circuit according to the fourth embodiment in the image sensor shown in FIG. 1. The same reference numerals as in other embodiments denote the same components, and a repetitive description of them will be omitted. A difference from the first embodiment is that the memory 214 for storing the N signal is not provided, and a DOWN counter 1001 and an UP counter 1002 are provided instead of the counter 213 which is an UP/DOWN counter.

Figure 11:
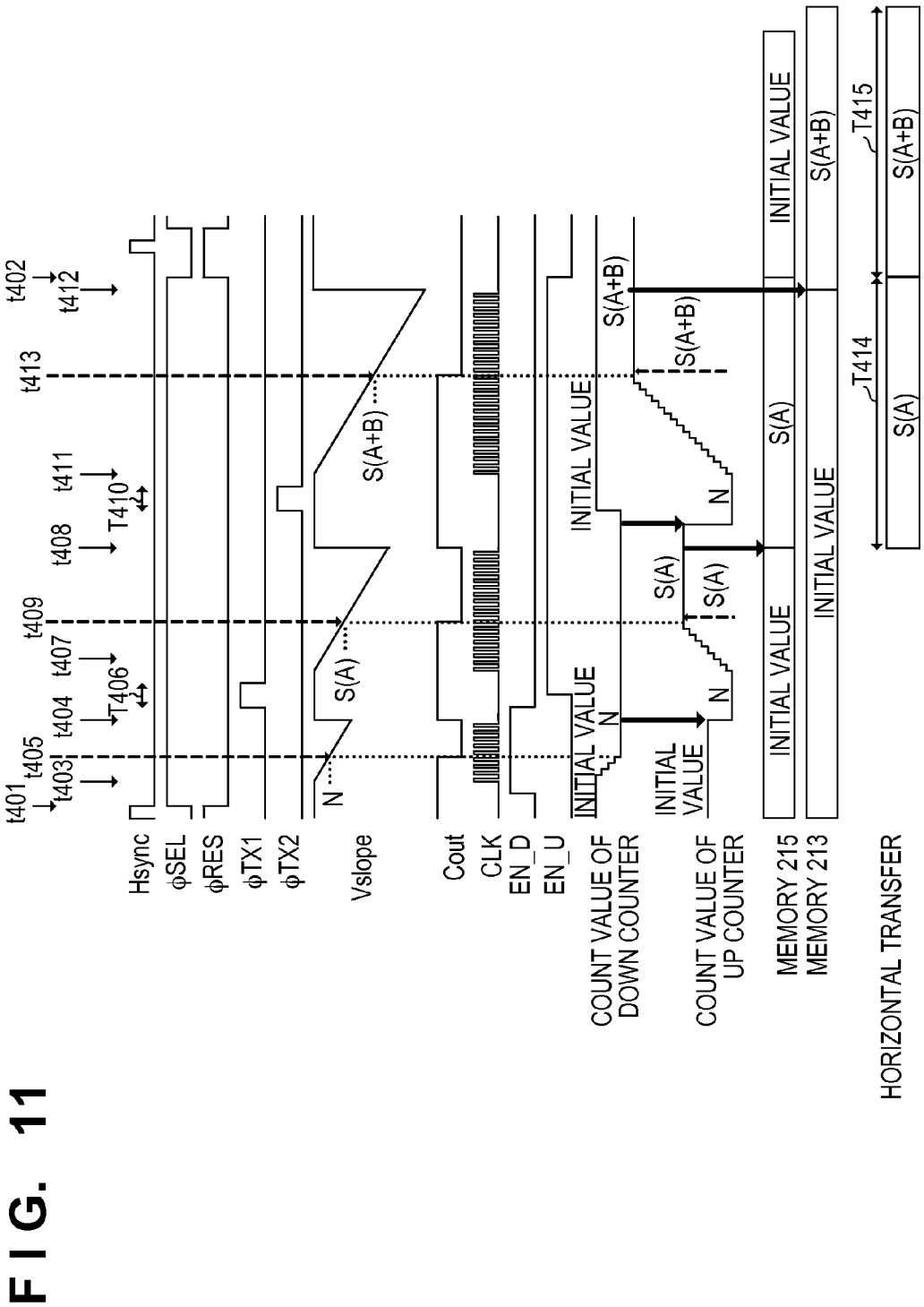
FIG. 11 is a timing chart showing a method of driving an image sensor according to the fourth embodiment.

Both the DOWN counter 1001 and the UP counter 1002 perform counting down and counting up in response to clocks CLK. The clock CLK is supplied to each counter simultaneously with the start of the generation of a ramp signal Vslope. The DOWN counter 1001 and the UP counter 1002 respectively perform counting down and counting up when an output Cout from a comparator 212 is at H level, and stop the counting operations at the same time when the output Cout is set at L level. Since the DOWN counter 1001 and the UP counter 1002 perform counting operations at different timings, they are independently controlled. In this embodiment, the counters are independently controlled such that the DOWN counter 1001 performs a counting operation when a control signal EN_D is at H level, and the UP counter 1002 performs a counting operation when a control signal EN_U is at H level. Alternatively, it is possible to independently control the counting operations of the DOWN counter 1001 and the UP counter 1002 by independently controlling the input of the clock CLK and the input of the output Cout. The operation of this embodiment will be described with reference to FIG. 11.

Before the A/D conversion of the N signal from time t403, the control signal EN_D is set at H level. When the ramp signal Vslope is generated, the DOWN counter 1001 starts counting down. When the voltage level of the ramp signal Vslope matches the level of the N signal, the output Cout from the comparator 212 is inverted at time t405, and the DOWN counter 1001 stops counting. When the A/D conversion of the N signal is complete at time t404, the value obtained by A/D-converting the N signal stored in the DOWN counter 1001 is copied to the UP counter 1002. The control signal EN_D is set at L level at time t404 to make the DOWN counter 1001 stop operating.

Subsequently, before the A/D conversion of the S(A) signal from time t407, the control signal EN_U for the UP counter 1002 is set at H level. The UP counter 1002 then A/D-converts the S(A) signal. The initial value of the UP counter 1002 is the value obtained by the DOWN counter 1001 by counting down the N signal. The ramp signal Vslope is generated, and the clock CLK is input to the UP counter 1002, thereby starting counting the clocks CLK. When the voltage level of the ramp signal Vslope matches the level of the S(A) signal at time t409, the output Cout from the comparator 212 is inverted to make the UP counter 1002 stop the counting operation. At this time, the value obtained by A/D-converting the S(A) signal is stored in the UP counter 1002. At time t408, the value obtained by A/D-converting the S(A) signal stored in the UP counter 1002 is copied to the memory 215. Thereafter, before the A/D conversion of the S(A+B) signal, the value obtained by A/D-converting the N signal stored in the DOWN counter 1001 is copied to the UP counter 1002. After the value of the N signal in the DOWN counter 1001 is copied to the UP counter 1002, the value of the DOWN counter 1001 may be returned to the initial value. The DOWN counter 1001 may be returned to the initial value before the N signal readout period from the next row. The UP counter 1002 A/D-converts the S(A+B) signal from time t411. When the voltage level of the ramp signal Vslope matches the level of the S(A+B) signal at time t413, the output Cout from the comparator 212 is inverted, and the A/D conversion ends. At this time, the value obtained by A/D-converting the S(A+B) signal is stored in the UP counter 1002. At time t412, the value of the UP counter 1002 is then copied to the memory 216.

As described above, the DOWN counter 1001 and the UP counter 1002 are provided instead of the UP/DOWN counter, and the N signal A/D-converted by the DOWN counter 1001 is stored in the DOWN counter 1001. This value is then copied to the UP counter 1002 before S(A) signal readout and S(A+B) signal readout. This obviates the necessity of the memory 214 for the N signal. This embodiment can reduce the circuit scale when the circuit scale of the DOWN counter 1001 and the UP counter 1002 is smaller than the circuit scale of the counter 213 as the UP/DOWN counter and the memory 214. An image capturing apparatus can be formed by using the image sensor according to this embodiment for the image capturing apparatus described in the first embodiment as in the above manner.

Fifth Embodiment

Figure 12:
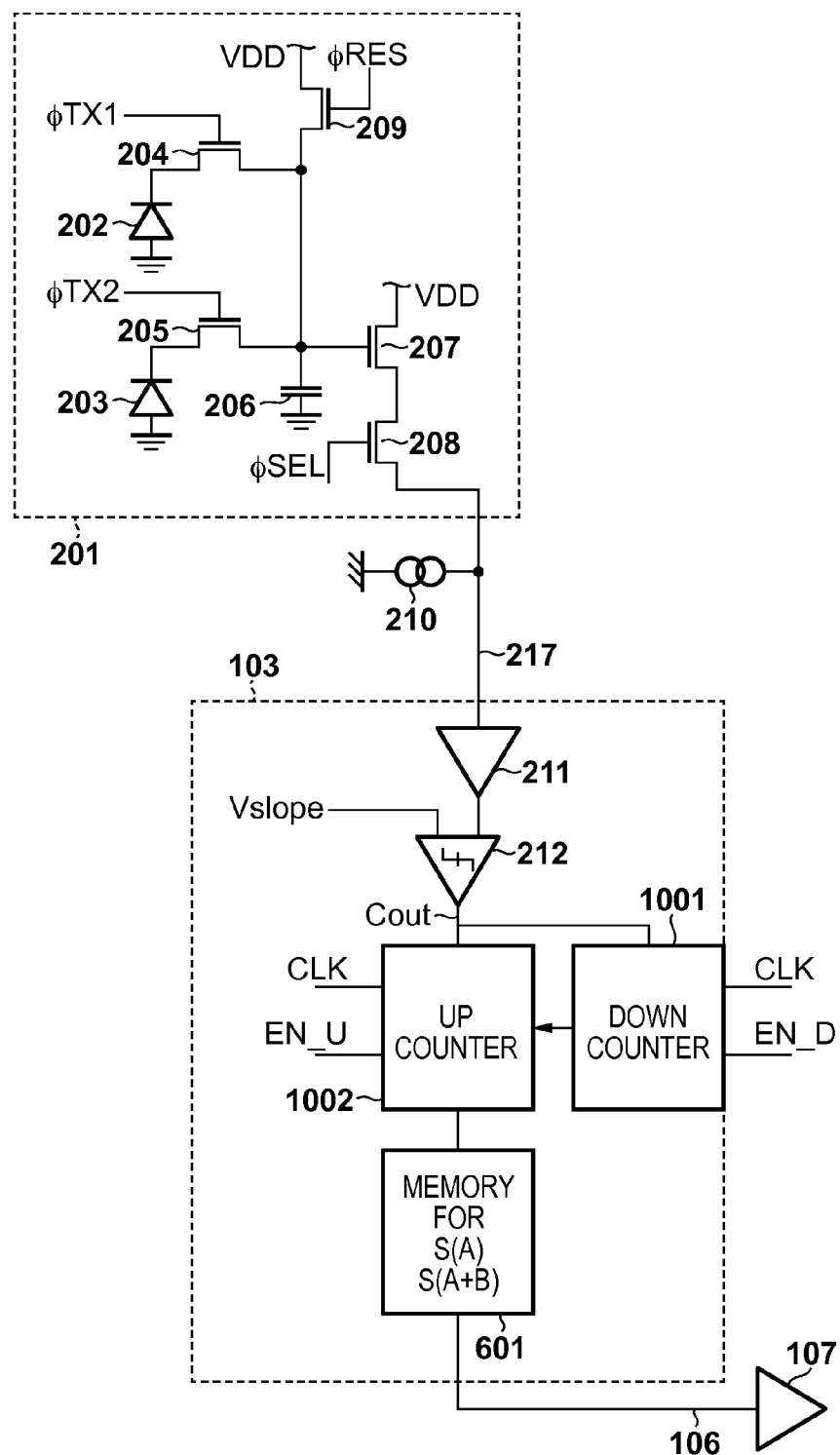
FIG. 12 is a view showing a pixel and a column circuit according to the fifth embodiment.

The fifth embodiment of the present invention will be described below with reference to the accompanying drawings. FIG. 12 is a view showing the arrangements of a pixel and a column circuit in an image sensor according to the fifth embodiment. The same reference numerals as in other embodiments denote the same components, and a repetitive description of them will be omitted. This embodiment is the same as the fourth embodiment in that it uses an UP counter and a DOWN counter, but differs in that a memory 601 serves as both the memory 215 for storing the S(A) signal and the memory 216 for storing the S(A+B) signal. The memory 601 operates so as to store the S(A) signal at a given time and store the S(A+B) signal at another time.

Figure 13:
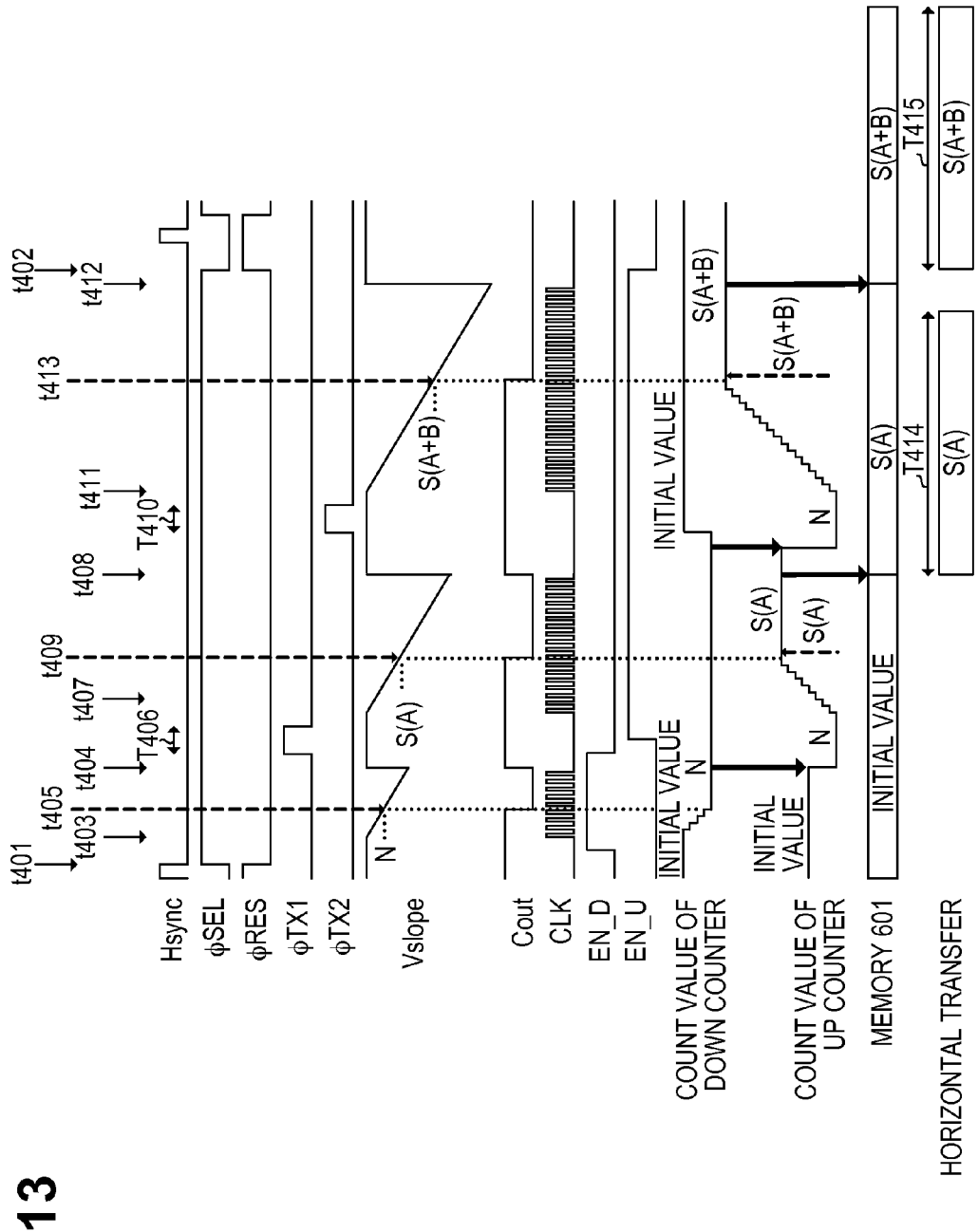
FIG. 13 is a timing chart showing a method of driving an image sensor according to the fifth embodiment.

The fifth embodiment will be described with reference to FIG. 13. A DOWN counter 1001 A/D-converts the N signal and stores the resultant value. The value of the N signal stored in the DOWN counter 1001 is copied as an initial value to an UP counter 1002 before the A/D conversion of the S(A) signal and the S(A+B) signal by the UP counter 1002. The fifth embodiment is the same as the fourth embodiment in that the UP counter 1002 A/D-converts the S(A) signal and the S(A+B) signal. After the value obtained by A/D-converting the S(A) signal is copied from the UP counter 1002 to the memory 601, the value is transferred to the horizontal output line under the control of the horizontal transfer circuit. The fifth embodiment differs from the fourth embodiment in that the UP counter 1002 A/D-converts the S(A+B) signal by using the value of the N signal as the initial value during a period T414 in which horizontal transfer is performed. After the end of the horizontal transfer period T414, the value of the S(A+B) signal stored in the counter 213 is copied to the memory 601 at time t412, and is then read out.

As described above, ending the horizontal transfer period T414 by the time when the signal obtained by A/D-converting the S(A+B) signal is read out allows the use of the common memory to store the S(A) signal and the S(A+B) signal. This makes it possible to reduce the circuit scale by one memory as compared with the fourth embodiment. Note that the memory 601 may be reset to the initial value in the interval between the end of the horizontal transfer period T414 and the S(A+B) signal readout. An image capturing apparatus can be formed by using the image sensor according to this embodiment for the image capturing apparatus described in the first embodiment as in the above manner.

Sixth Embodiment

Figure 14A:
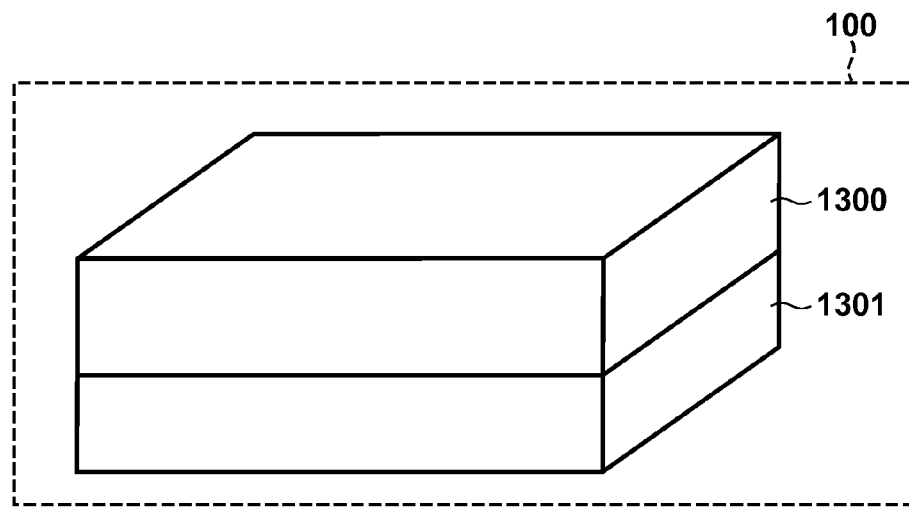
FIGS. 14A and 14B are views showing the arrangement of an image sensor according to the sixth embodiment.
Figure 14B:
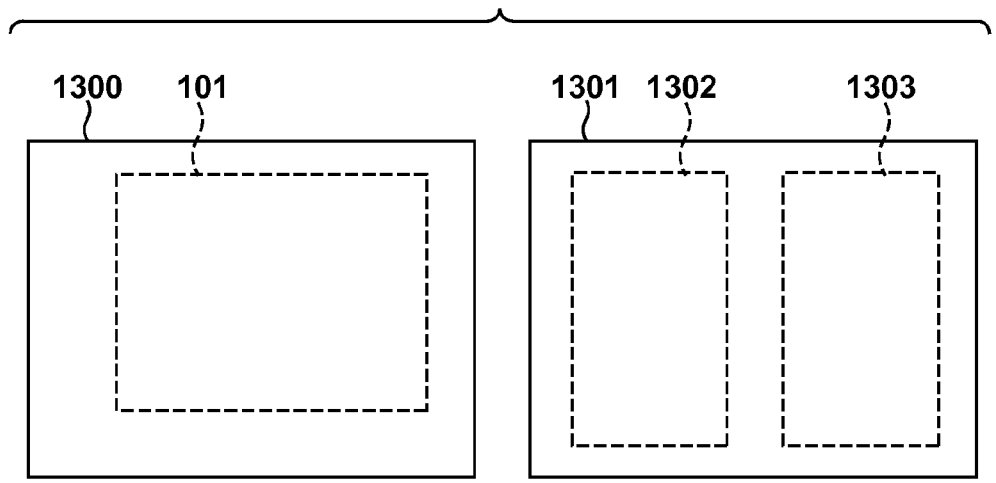

The sixth embodiment of the present invention will be described with reference to FIGS. 14A and 14B. This embodiment will exemplify a case in which an image sensor 100 is a multilayer image sensor. As shown in FIG. 14A, in the image sensor 100 according to this embodiment, a first semiconductor chip 1300 for an image sensor and a second semiconductor chip 1301 for a high-speed logic process are stacked on each other at a chip level.

FIG. 14A is a perspective view of the semiconductor chips. FIG. 14B is a plan view of the first semiconductor chip 1300 and the second semiconductor chip 1301. The first semiconductor chip 1300 is provided with a region including a pixel unit 101. The second semiconductor chip 1301 is provided with logic circuits 1302 and 1303 capable of performing high-speed processes, such as column circuits 103 and a horizontal selecting circuit 105. Note that some of the components provided on the second semiconductor chip 1301, for example, the column circuits 103, may be provided on the first semiconductor chip 1300. In addition, the number of semiconductor chips to be stacked on each other in this multilayer structure is not specifically limited as long it is two or more.

Making the image sensor 100 have a multilayer structure in this manner can implement the arrangements described in the first to fifth embodiments without increasing the chip area of the image sensor 100. Note that an image capturing apparatus can be formed by using the image sensor according to this embodiment for the image capturing apparatus described in the first embodiment as in the above manner.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-088551, filed Apr. 22, 2014, and 2015-041779, filed Mar. 3, 2015, which are hereby incorporated by reference herein in their entirety.

What is claimed is:

1. An image sensor, comprising:
a plurality of pixels arranged in matrix, with each pixel including a plurality of photoelectric conversion portions, a floating diffusion portion shared by the plurality of photoelectric conversion portions, a transfer portion configured to transfer charges generated by the plurality of photoelectric conversion portions to the floating diffusion portion, and a reset portion configured to reset the floating diffusion portion; and
a plurality of column circuits, each including an analog/digital converter configured to convert an analog signal corresponding to the amount of charge in the floating diffusion portion into a digital signal,
wherein each analog/digital converter includes a comparator configured to compare the analog signal with a reference signal and change an output in accordance with a magnitude relation between the analog signal and the reference signal and a counter to be controlled by an output from the comparator,
performs a first operation of converting an analog signal corresponding to the amount of charge in the floating diffusion portion reset by the reset portion into a digital signal, a second operation of converting an analog signal obtained from some portion of the plurality of photoelectric conversion portions into a digital signal, and a third operation of converting analog signals obtained from all the plurality of photoelectric conversion portions into digital signals,
and increases or decreases a count value of the counter in a first direction in the first operation, and increases or decreases the count value of the counter in a direction opposite to the first direction in the second operation and the third operation.

2. The sensor according to claim 1, wherein the reference signal comprises a ramp signal having a voltage level that changes with time.

3. The sensor according to claim 1, wherein the second operation and the third operation are performed after execution of the first operation and while the floating diffusion portion is not reset.

4. The sensor according to claim 1, further comprising a microlens, wherein the plurality of photoelectric conversion portions are arranged below identical microlenses.

5. The sensor according to claim 1, further comprising a first memory, wherein a value obtained by the counter by the first operation is held as a first digital signal in the first memory, the second operation is performed while a value of the first digital signal is set in the counter, the value obtained by the counter is output as a second digital signal, the value of the first digital signal held in the first memory before the third operation is set in the counter, and the third operation is performed to output the value obtained by the counter as a third digital signal.

6. The sensor according to claim 5, further comprising a horizontal output line to which the column circuits output analog/digital-converted signals and a second memory, wherein the second digital signal is output to the horizontal output line upon being stored in the second memory, and the third digital signal is then stored in the second memory and output from the horizontal output line.

7. The sensor according to claim 5, further comprising a second memory, wherein a first digital signal stored in the first memory is set in the counter after the second digital signal is stored in the second memory, the third operation is performed, and an obtained third digital signal is stored in the first memory.

8. The sensor according to claim 1, wherein the counter includes a first counter configured to count in a first direction and a second counter configured to count in a direction opposite to the first direction, wherein the first counter counts during the first operation, and the second counter counts during the second operation and the third operation.

9. The sensor according to claim 8, wherein before the second operation and the third operation, a value obtained by the first counter by the first operation is set in the second counter.

10. The sensor according to claim 9, further comprising a first memory and a second memory, wherein a value obtained by the second counter by the second operation is stored as a second digital signal in the first memory, and a value obtained by the second counter by the third operation is stored as a third digital signal in the second memory.

11. The sensor according to claim 9, further comprising a horizontal output line to which the column circuits output analog/digital-converted signals, wherein a value obtained by the second counter by the second operation is stored as a second digital signal in the first memory and is then output from the horizontal output line, and a value obtained by the counter by the third operation is then stored as a third digital signal in the first memory.

12. The sensor according to claim 1, further comprising a structure obtained by stacking a plurality of semiconductor chips on each other.

13. An image sensor, comprising:
a plurality of pixels arranged in matrix, with each pixel including a plurality of photoelectric conversion portions, a floating diffusion portion shared by the plurality of photoelectric conversion portions, a transfer portion configured to transfer charges generated by the plurality of photoelectric conversion portions to the floating diffusion portion, and a reset portion configured to reset the floating diffusion portion; and
a plurality of column circuits, each including an analog/digital converter configured to convert an analog signal corresponding to the amount of charge in the floating diffusion portion into a digital signal,
wherein each analog/digital converter includes a comparator configured to compare the analog signal with a reference signal and change an output in accordance with a magnitude relation between the analog signal and the reference signal and a counter to be controlled by an output from the comparator,
performs a first operation of converting an analog signal corresponding to the amount of charge in the floating diffusion portion reset by the reset portion into a digital signal, a second operation of converting an analog signal obtained from some portions of the plurality of photoelectric conversion portions into a digital signal, and a third operation of converting analog signals obtained from all the plurality of photoelectric conversion portions into digital signals,
and in the second operation and the third operation, the counter starts counting from the count value obtained by the first operation.

14. The sensor according to claim 13, wherein the reference signal comprises a ramp signal having a voltage level that changes with time.

15. The sensor according to claim 13, wherein the second operation and the third operation are performed after execution of the first operation and while the floating diffusion portion is not reset.

16. The sensor according to claim 13, further comprising a microlens, wherein the plurality of photoelectric conversion portions are arranged below identical microlenses.

17. The sensor according to claim 13, further comprising a first memory, wherein a value obtained by the counter by the first operation is held as a first digital signal in the first memory, the second operation is performed while a value of the first digital signal is set in the counter, the value obtained by the counter is output as a second digital signal, the value of the first digital signal held in the first memory before the third operation is set in the counter, and the third operation is performed to output the value obtained by the counter as a third digital signal.

18. The sensor according to claim 17, further comprising a horizontal output line to which the column circuits output analog/digital-converted signals and a second memory, wherein the second digital signal is output to the horizontal output line upon being stored in the second memory, and the third digital signal is then stored in the second memory and output from the horizontal output line.

19. The sensor according to claim 17, further comprising a second memory, wherein a first digital signal stored in the first memory is set in the counter after the second digital signal is stored in the second memory, the third operation is performed, and an obtained third digital signal is stored in the first memory.

20. The sensor according to claim 13, further comprising a structure obtained by stacking a plurality of semiconductor chips on each other.

* * * * *